US011643517B2

(12) United States Patent
Acharya et al.

(10) Patent No.: US 11,643,517 B2
(45) Date of Patent: May 9, 2023

(54) ACOUSTICALLY ACTIVE MATERIALS

(71) Applicant: 3M INNOVATIVE PROPERTIES COMPANY, St. Paul, MN (US)

(72) Inventors: Bharat R. Acharya, Woodbury, MN (US); Derek J. Dehn, Maplewood, MN (US); Fabian Stolzenburg, Woodbury, MN (US); Noah O. Shanti, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

(21) Appl. No.: 16/616,157

(22) PCT Filed: Jun. 11, 2018

(86) PCT No.: PCT/US2018/036853
§ 371 (c)(1),
(2) Date: Nov. 22, 2019

(87) PCT Pub. No.: WO2018/231687
PCT Pub. Date: Dec. 20, 2018

(65) Prior Publication Data
US 2020/0095392 A1    Mar. 26, 2020

Related U.S. Application Data

(60) Provisional application No. 62/519,560, filed on Jun. 14, 2017.

(51) Int. Cl.
*G10K 11/165* (2006.01)
*C08J 9/00* (2006.01)
(Continued)

(52) U.S. Cl.
CPC ............... *C08J 9/0066* (2013.01); *C08J 9/28* (2013.01); *C08K 3/22* (2013.01); *C08K 5/01* (2013.01);
(Continued)

(58) Field of Classification Search
CPC ............ C09J 9/0066; C09J 9/28; C08K 3/22; C08K 5/01; G10K 11/162; G10K 11/165;
(Continued)

(56) References Cited

U.S. PATENT DOCUMENTS 4,791,037 A      12/1988  Anderman
4,877,679 A *   10/1989  Leatherman .............. B32B 5/32
                                                                442/58
(Continued)

FOREIGN PATENT DOCUMENTS

CN    102186133 A    9/2011
EP    0 365 111 A2    4/1990
(Continued)

OTHER PUBLICATIONS

US 8,594,357 B1, 11/2013, Lin (withdrawn)
(Continued)

*Primary Examiner* — Michael M Dollinger
*Assistant Examiner* — Christina H. W. Rosebach (57) ABSTRACT

A polymer matrix composite includes a porous polymeric network structure; and a plurality of acoustically active particles distributed within the polymeric network structure. The weight fraction of acoustically active particles is between 0.80 and 0.99, based on the total weight of the polymer matrix composite. The polymer matrix composite has an air flow resistance of less than 100 seconds/50 mL/500 μm.

18 Claims, 6 Drawing Sheets

(51) Int. Cl.
*C08J 9/28* (2006.01)
*C08K 3/22* (2006.01)
*C08K 5/01* (2006.01)
*G10K 11/162* (2006.01)

(52) U.S. Cl.
CPC .......... *G10K 11/162* (2013.01); *G10K 11/165* (2013.01); *C08J 2201/0502* (2013.01); *C08J 2201/0522* (2013.01); *C08J 2325/04* (2013.01); *C08J 2367/00* (2013.01); *C08J 2369/00* (2013.01); *C08J 2371/00* (2013.01); *C08J 2375/04* (2013.01); *C08J 2377/00* (2013.01); *C08K 2201/005* (2013.01); *C08K 2201/006* (2013.01)

(58) Field of Classification Search
CPC ........ C08J 2201/0502; C08J 2201/0522; C08J 2201/005; C08J 2201/006; C08J 2325/04; C08J 2367/00; C08J 2369/00; C08J 2375/04; C08J 2377/00; C08J 2371/00; C08J 2375/004; C08J 9/0066; C08J 9/28
See application file for complete search history.

(56) References Cited

U.S. PATENT DOCUMENTS

| | | | |
|---|---|---|---|
| 4,892,779 A | 1/1990 | Leatherman et al. | |
| 6,171,723 B1 | 1/2001 | Loch | |
| 6,512,834 B1 | 1/2003 | Banter | |
| 6,524,742 B1 | 2/2003 | Emanuel | |
| 6,558,840 B1 | 5/2003 | Hikmet | |
| 7,953,240 B2 | 5/2011 | Matsumura | |
| 8,265,330 B2 | 9/2012 | Fukunishi | |
| 8,292,023 B2 | 10/2012 | Slotte | |
| 8,335,333 B2 | 12/2012 | Saiki | |
| 8,687,836 B2 | 4/2014 | Lin | |
| 8,767,998 B2 | 7/2014 | Imamura | |
| 8,794,373 B1 | 8/2014 | Lin | |
| 8,885,863 B2 | 11/2014 | Takashima | |
| 8,942,402 B2 | 1/2015 | Yuasa | |
| 2004/0176484 A1 | 9/2004 | Park | |
| 2005/0086823 A1 | 4/2005 | Subramonian | |
| 2005/0263456 A1* | 12/2005 | Cooper | A61L 2/0082 210/660 |
| 2009/0155548 A1 | 6/2009 | Boyer | |
| 2011/0048844 A1 | 3/2011 | Papakyriacou | |
| 2013/0068693 A1* | 3/2013 | Rabins | B01D 15/00 210/660 |
| 2013/0170687 A1 | 7/2013 | Papakyriacou | |
| 2013/0170690 A1 | 7/2013 | Backman | |
| 2014/0254836 A1 | 9/2014 | Tong | |
| 2015/0099168 A1 | 4/2015 | Guo | |
| 2015/0176749 A1 | 6/2015 | D'Arcy | |
| 2022/0165242 A1* | 5/2022 | Mok | G10K 11/168 |

FOREIGN PATENT DOCUMENTS

| | | |
|---|---|---|
| EP | 2424270 | 2/2012 |
| EP | 2577985 | 4/2013 |
| JP | 2011199574 | 10/2011 |
| JP | 5522282 | 7/2013 |
| WO | WO 2019-097449 | 5/2019 |

OTHER PUBLICATIONS

"SiliametS Metal Scavengers" by Silicycle. Accessed at https://www.dichrom.com/app/download/5805622186/SiliCycle-SiliaMetS-Brochure.pdf. Accessed 2021. (Year: 2021).*

"SiliaMetS Thiol" by Silicycle. Accessed at Silicylce.com. (Year: 2014).*

"Designation: D726-94 (Reapproved 2003) Standard Test Method for Resistance of Nonporous Paper to Passage of Air" by ASTM international. Accessed 2021 via ASTM compass. (Year: 2021).*

Bechwati, "Low Frequency Sound Propagation in Activated Carbon", Journal of the Acoustical Society of America, Jul. 2012, vol. 132, No. 1, pp. 239-248.

Small, "Closed-Box Loudspeaker Systems", Journal of the Audio Engineering Society, Dec. 1972, vol. 20, No. 10, pp. 798-808.

International Search Report for PCT International Application No. PCT/US2018/36853, dated Aug. 30, 2018, 2pgs.

* cited by examiner

ACOUSTICALLY ACTIVE MATERIALS

CROSS REFERENCE TO RELATED APPLICATIONS

This application is a national stage filing under 35 U.S.C. 371 of PCT/US2018/036853, filed Jun. 11, 2018, which claims the benefit of U.S. Application No. 62/519,560, filed Jun. 14, 2017, the disclosure of which is incorporated by reference in its/their entirety herein.

FIELD

The present disclosure relates to materials useful as acoustic components in electronic devices.

BACKGROUND

Various acoustically active materials have been described in, for example, U.S. Pat. No. 8,794,373 and U.S. Pat. App. Pub. 2011/048844. Additionally, various methods for forming polymer structures containing particles have been described in, for example, U.S. Pat. Nos. 4,791,037 and 6,171,723

SUMMARY

In some embodiments, a polymer matrix composite is provided. The polymer matrix composite includes a porous polymeric network structure and a plurality of acoustically active particles distributed within the polymeric network structure. The weight fraction of the acoustically active particles is between 0.80 and 0.99, based on the total weight of the polymer matrix composite. The polymer matrix composite has an air flow resistance of less than 100 seconds/50 mL/500 μm.

In some embodiments, a method of making a polymer matrix composite is provided. The method includes mixing a thermoplastic polymer, a solvent the thermoplastic polymer is soluble in, and a plurality of acoustically active particles to form a miscible thermoplastic polymer-solvent solution. The method further includes inducing phase separation of the thermoplastic polymer from the solvent; and removing at least a portion of the solvent, thereby forming a polymer matrix composite. The polymer matrix composite has an air flow resistance of less than 100 seconds/50 mL/500 μm.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which:

FIGS. 4(*a*), 4(*b*) and 4(*c*) show results of impedance and SPL as a function of frequency for an embodiment of the present invention.

FIGS. 5(*a*), 5(*b*) and 5(*c*) show results of impedance and SPL as a function of frequency for an embodiment of the present invention.

FIGS. 6(*a*), 6(*b*) and 6(*c*) show results of impedance and SPL as a function of frequency for comparative example A.

FIGS. 7(*a*), 7(*b*) and 7(*c*) show results of impedance and SPL as a function of frequency for an embodiment of the present invention.

DETAILED DESCRIPTION

Acoustic components of electronic devices such as speakers in handheld electronic devices have become increasingly smaller as the electronic devices have become thinner. Small enclosure cavities in the devices make it difficult to achieve rich sounds in the low-frequency range. Acoustically active materials, which can modify the acoustic output of acoustic components, are important in such applications. In some cases it is desirable to increase the acoustic output in at least a range of frequencies, while in other cases it is desirable to reduce the acoustic output in at least a range of frequencies (e.g., noise reduction). For example, acoustically active materials may be used to improve the sound output of microspeakers in the low frequency ("bass") audible range and, thereby, the perceived audio quality of such devices. Such materials placed inside the speaker enclosure may also help lower the resonance frequency of the device.

Many materials are capable of modifying acoustic waves through physical interactions determined by their material properties. Common acoustically active materials include polymer foam, natural fiber, zeolite and activated carbon. Other acoustically active materials include, silica ($SiO_2$), alumina ($Al_2O_3$), zirconia ($ZrO_3$), magnesia (MgO), iron oxide black ($Fe_3O_4$), molecular sieve, fullerene, and carbon nanotube.

Acoustically active materials can be used as a powder form. When used within speaker cavities, the loose active particles are often packaged in pouches or other containers. In some instances, said powders are held together using polymer scaffolds or binders, which can allow for a simpler container or even eliminate the need for a container. The amount of polymer needed to hold said powders can be significant and in some cases can cover the surfaces of the powders, thereby compromising their acoustic activity. In some instances, the polymer can even cover pores present in said powder materials, thereby further compromising acoustic activity.

Generally, the present disclosure is directed to acoustically active materials held together via a porous polymer network that enables minimization of overall polymeric content. Since the thin polymer members (e.g, fibrils) (as opposed to a conventional binder materials that tend to coat the active materials) hold the active particles together, the surfaces and pores, if present, in the active materials remain accessible for the sound waves to interact and therefore enable shift in resonant frequency using relatively inexpensive acoustically active materials such as alumina. For example, using the polymer composites of the present disclosure, a shift in resonance frequency of 146.7 Hz and an average enhancement of sound pressure level of 1.69 dB over the frequency range of 200 to 500 Hz have been demonstrated in a speaker cavity of about 1 $cm^3$ in volume.

It should be understood that:

The term "metal oxide" refers to stoichiometric or nearly stoichiometric metal oxide, metal hydroxide, or metal hydride compounds. The metal may include any one or mix of metallic and semimetallic (e.g., Si, B, etc.) elements. The compound may be crystalline or amorphous.

The term "compound metal oxide" refers to stoichiometric or nearly stoichiometric metal oxide including any mix of two or more metallic and/or semimetallic (e.g., Si, B, etc.) elements. The compound may be crystalline or amorphous.

The term "compound transition metal oxide" refers to stoichiometric or nearly stoichiometric metal oxide including any mix of two or more transition metal elements (e.g. elements in groups 3-12 of the periodic table of elements). The compound may be crystalline or amorphous.

The term "acoustically active" refers to the ability of a material to interact with a time-varying pressure wave (e.g., acoustic wave) impinging upon it or propagating through it to cause changes in wave properties (e.g., frequency, wavelength, amplitude, velocity), which is manifested in a change in resonance frequency and/or sound pressure level output of a sound-producing device (e.g., loudspeaker) containing said material. The changes may be measured according to the test methods herein respectively entitled "Method for Impedance Test" and "Method for Sound Pressure Level (SPL) Test." As used herein, an "acoustically active" material is a material that, in accordance with the Method for Impedance Test or the Method for Sound Pressure Level (SPL) Test, reduces the resonance frequency ($F_0$) of a loudspeaker system with a 1 cm$^3$ back volume by at least 10 Hz or improves the sound pressure level (SPL) of a loudspeaker system with a 1 cm$^3$ back volume by at least 0.1 dB averaged over the frequency range from 200 to 500 Hz.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure provides a polymer matrix composite including a polymeric network structure and an acoustically active material (e.g., particles) distributed or held within the polymeric network structure.

In some embodiments, the acoustically active materials may include acoustically active metal oxide particles such as, for example, one or more of acoustically active aluminum oxides, aluminum hydroxides, zirconium oxides, zirconium hydroxides, ferrous hydrates, compound metal oxides, compound transition metal oxides, and the like. In some embodiments, the acoustically active materials can have a composition that is free of or substantially free of zeolites and activated carbon.

In some embodiments, the acoustically active materials may be in the form of particles. The particles may have an average particle size (average length of longest dimension) ranging from, for example, 100 nm to 20 microns, from 500 nm to 10 microns, from 100 nm to 2 microns, from 500 nm to 2 microns, from 1 micron to 10 microns, or from 1 micron to 5 microns. In some embodiments, the acoustically active materials can be in the form of agglomerate particles comprised of a plurality of smaller particles bound together by, for example, cohesive forces, inorganic binders, or organic binders.

In some embodiments, the acoustically active material may have an internal porosity. As used herein, "internal porosity" may refer to continuous or discontinuous void volume(s) within the acoustically active material particles or agglomerates of acoustically active materials. The void volume(s) may intersect the surface of the acoustically active material particles or agglomerates of acoustically active material particles or may be fully contained within the acoustically active material particles or agglomerates of acoustically active material particles. The void volume(s) may be filled with air or another gas or mixture of gases, at atmospheric pressure, a pressure below atmospheric pressure, or a pressure above atmospheric pressure. In some embodiments, the acoustically active materials may have average pore sizes ranging from between 1 nm and 100 microns. In some embodiments the pore size of the active material may have a bimodal distribution, with small pores in between 1 and 100 nm and large inter-particles pores between 100 nm and 100 microns. Conventional pore size analysis techniques, including imaging of cross-sections (optical microscopy, scanning electron microscopy or atomic force microscopy, for example) and analysis of the image using appropriate software, for example ImageJ software (an open source software, available on-line at http://imagej.net, for example) may be used to statistically analyze the pore size and pore size distribution. X-ray microtomography and mercury porosimetry may also be used to analyze the pore size and/or pore size distribution. In some embodiments, the acoustically active material can have a specific surface area greater than, for example 50 m$^2$/g, greater than 300 m$^2$/g, greater than 500 m$^2$/g, or ranging from, for example from 50 to 1000 m$^2$/g, from 300 to 1000 m$^2$/g, or from 500 to 1000 m$^2$/g, or even from 300 to 500 m$^2$/g. Conventional specific surface area analysis techniques, including BET surface area or oil absorption may be used to statistically analyze the specific surface area.

In some embodiments, the acoustically active material may be hydrophobic. The material may be surface treated or modified so as to impart hydrophobicity to otherwise hydrophilic materials. In some embodiments, the surface treatment may include a silane or fluorine based surface treatment. In some embodiments the hydrophobic surface treatment is applied in a concentration which minimizes consumption of active surface sites while still imparting hydrophobicity. In some embodiments, the hydrophobic surface treatment is attached to 0.1 to 10% of active surface sites, 0.1 to 5% of active surface sites, 0.1 to 3% of active surface sites, or 0.5 to 3% of active surface sites, based on the total number of active surface sites calculated according to theoretical distribution of said surface sites and measured surface area or measured by techniques such as $O_2$ chemisorption, absorption of alcohols, or similar techniques known to those skilled in the art. As used herein, the term "active surface sites" refers to chemical sites on the surface of the acoustically active material available to ionically or covalently bond to modifying chemistry (e.g. lone oxygen atoms).

In some embodiments, the acoustically active material may be electrically insulating. In some embodiments, the electrical resistivity of the acoustically active material may be at least $1\times10^{10}$ Ω·m.

In some embodiments, the acoustically active material may be distributed, or held within a polymeric network structure. The polymeric network structure may be described as a porous polymeric network or a porous phase separated polymeric network. Generally, the porous polymeric network may include an interconnected network of polymeric structures (e.g, nodules, node and fibrils, fibrils, open cells, closed cells, leaf lace, honeycomb) which, as discussed in more detail below, may in some embodiments result from a process in which the polymeric material and an appropriate solvent are mixed to form a miscible polymer-solvent solution, followed by phase separation of the polymer from the solvent, and then removal of at least a portion of the solvent. The interconnected polymeric structures may adhere directly to the surface of the acoustically active material and act as a binder for the acoustically active material. In this regard, the space between adjacent acoustically active materials (e.g., particles or agglomerate particles) may include polymeric structures as opposed to a solid matrix material, thereby providing desired porosity needed for sound waves to interact with the composite. It is believed that the relatively thin polymeric structures enable extremely low binder loading as well as maintains availability of the surfaces and pores, if present, of the acoustically active materials. Surprisingly, this unique construction enables strong acoustic performance while incorporating relatively low cost materials.

In some embodiments, the polymeric network structure may include a 3-dimensional reticular structure that includes an interconnected network of polymeric fibrils. The individual fibrils may have an average width of between 10 nm and 100 nm, 100 nm and 500 nm, or 500 nm and 5 microns.

In some embodiments, the acoustically active material may be dispersed within the polymeric network structure such that an external surface of the individual units of the acoustically active material (e.g., individual particles or individual agglomerate particles) is mostly uncontacted, or uncoated, by the polymeric network structure. In this regard, in some embodiments, the average percent areal coverage of the polymeric network structure on the external surface of the individual units of the acoustically active material (i.e., the percent of the external surface area that is in direct contact with the polymeric network structure) may be less than 50%, less than 40%, less than 30%, less than 20%, less than 10%, less than 5%, or less than 1%, based on the total surface area of the external surfaces of the individual units of the acoustically active material.

In some embodiments, the polymeric network structure may include, consist essentially of, or consist of one or more thermoplastic polymers. The thermoplastic polymers are not particularly limited. In some embodiments, the thermoplastic polymers may include at least one of polyurethane, polyester (e.g. polyethylene terephthalate, polybutylene terephthalate and polylactic acid), polyamide (e.g. nylon 6, nylon 6,6 and polypetides), polyether (e.g. polyethylene oxide and polypropylene oxide), polycarbonate (e.g. bisphenol-A-polycarbonate), polyimide, polysulphone, polyphenylene oxide, polyacrylate (e.g. thermoplastic polymers formed from the addition polymerization of monomer(s) containing an acrylate functional group), polymethacrylate (e.g. thermoplastic polymers formed from the addition polymerization of monomer(s) containing a methacrylate functional group), polyolefin (e.g. polyethylene and polypropylene), styrene and styrene based random and block copolymer, chlorinated polymer (e.g. polyvinyl chloride), fluorinated polymer (e.g. polyvinylidene fluoride; copolymers of tetrafluoroethylene, hexafluoropropylene and vinylidene fluoride; copolymers of ethylene, tetrafluoroethylene; and hexafluoropropylene; and polytetrafluroethylene), and copolymers of ethylene and chlorotrifluoroethylene. The thermoplastic polymers may include homopolymers or copolymers, e.g. block copolymers or random copolymers. In some embodiments, the thermoplastic polymer may include a mixture of two or more thermoplastic polymer types, e.g. a mixture of polyethylene and polypropylene or a mixture of polyethylene and polyacrylate. In some embodiments, the polymer may be at least one of polyethylene (e.g. ultra-high molecular weight polyethylene), polypropylene (e.g. ultra-high molecular weight polypropylene), polylactic acid, poly(ethylene-co-chlorotrifluoroethylene) and polyvinylidene fluoride. In some embodiments, the thermoplastic polymer is a single thermoplastic polymer, i.e. it is not a mixture of two or more thermoplastic polymer types. In some embodiments, the thermoplastic polymers may include, consist essentially of, or consist of polyethylene (e.g. ultra-high molecular weight polyethylene).

Generally, the molecular weight of the thermoplastic polymer is not particularly limited, except that it may have a molecular weight high enough to allow for phase separation from a solvent, resulting in the formation of the above-discussed network structure. In this regard, one or more (up to all) of the thermoplastic polymers may have a number average molecular weight greater than $5\times10^4$ g/mol. In some embodiments, the number average molecular weight of the thermoplastic polymer may be between $5\times10^4$ g/mol and $5\times10^7$ g/mol, between $5\times10^4$ g/mol and $1\times10^7$ g/mol, between, between $5\times10^4$ g/mol and $5\times10^6$ g/mol, between $1\times10^5$ g/mol and $1\times10^7$ g/mol, between $1\times10^5$ g/mol and $5\times10^6$ g/mol, between $1\times10^6$ g/mol and $1\times10^7$ g/mol, between $3\times10^6$ g/mol and $1\times10^7$ g/mol, between $5\times10^6$ g/mol and $1\times10^7$ g/mol, between $1\times10^6$ g/mol and $5\times10^7$ g/mol, between $3\times10^6$ g/mol and $5\times10^7$ g/mol, between $5\times10^6$ g/mol and $5\times10^7$ g/mol, or between $1\times10^6$ g/mol and $5\times10^6$ g/mol. Thermoplastic polymers having ultra-high molecular weights may be useful. In some embodiments, ultra-high molecular weight is defined as a thermoplastic polymer having a number average molecular weight of at least $3\times10^6$ g/mol. For purposes of the present disclosure, the number average molecular weight may be measured by known techniques in the art, including, but not limited to, gel permeation chromatography (GPC). GPC may be conducted in a suitable solvent for the thermoplastic polymer, along with the use of narrow molecular weight distribution polymer standards, e.g. narrow molecular weight distribution polystyrene standards. Thermoplastic polymers are generally characterized as being partially crystalline, exhibiting a melting point. In some embodiments, the thermoplastic polymer may have a melting point between 120° C. to 350° C., between 120° C. to 300° C., between 120° C. to 250° C. or between 120° C. to 200° C. The melting point of the thermoplastic polymer may be measured by known techniques in the art, including but not limited to, the on-set temperature measured in a differential scanning calorimetry (DSC) test, conducted with a 5 mg to 10 mg sample, at a heating scan rate of 10° C./min, while the sample is under a nitrogen atmosphere.

In some embodiments, the polymeric network structure may be a continuous network structure. By continuous network structure, it is meant that the polymer phase comprises a structure that is open cell with continuous voids or pores forming interconnections between the voids extending throughout the structure. In some embodiments, at least 10 percent, at least 30 percent, at least 50 percent, at least 70 percent, at least 90 percent, at least 95 percent or 100 percent of the polymer network structure, by volume, may be a continuous polymer network structure. It should be noted that for purposes of the present disclosure, the portion of the volume of the polymer matrix composite made up of the acoustically active material is not considered part of the polymeric network structure. In some embodiments, the polymer network may extend between two particles forming a network of interconnected particles.

As discussed above, in order to increase the acoustic performance characteristics of the polymer matrix composites of the present disclosure, it may be desirable to increase/maximize the amount of the acoustically active material in the polymer matrix composite. In some embodiments, the weight fraction of acoustically active material may be between 0.80 and 0.98, between 0.85 and 0.97 or even between 0.90 and 0.96, based on the total weight of the polymer matrix composite. In some embodiments, the volume fraction of acoustically active material may be between 0.10 and 0.80, between 0.20 and 0.80, between 0.30 and 0.80, between 0.10 and 0.75, between 0.20 and 0.75, between 0.30 and 0.75, between 0.10 and 0.70, between 0.20 and 0.70 or even between 0.30 and 0.70, based on the total volume of the polymer matrix composite. When determining volume fraction of acoustically active material, the volume of porosity within the acoustically active material may be included in the volume of the acoustically active material, i.e. the bulk density of the acoustically active material may be used to determine volume fraction.

In some embodiments, the acoustically active material may be uniformly distributed within the polymer matrix composite. As used herein, the term "uniformly distributed" refers to the particle concentration of a particular volume of a polymer matrix composite varying (over a length scale of at least 25 times the average particle size) by no more than 10% relative to the particle concentration of any other volume of the polymer matrix composite.

In some embodiments, the polymer matrix composites of the present disclosure, as a result of the polymeric network structure, may be porous. The porosity of the polymer matrix composite may be described as the ratio of the volume of pore space in the composite to the total bulk volume of the composite. This ratio may be expressed in terms of a percentage.

In some embodiments, the porosity of the polymer matrix composite, including porosity, if present, of the acoustically active material may be greater than 50%, 60%, 70%, 80%, or 90%, between 50 and 95%, 60 and 95%, 70 and 95%, 80 and 95%, 85 and 95% or 85 and 90%, or 90 and 95%. In some embodiments, the porosity of the polymer maxtrix composite may be tuned by calendaring (to reduce the porosity) or stretching (to increase the porosity) using conventional processes and methods.

The pore size of the polymeric network structure is not particularly limited. In some embodiments, the average pore size is on the micrometer scale, i.e. between about 1 micrometer and 1000 micrometers. In some embodiments, the pore size is on the nanometer scale, i.e. between about 10 nanometers and 1000 nanometers. In some embodiments the average or median pore size of the polymeric network structure is between 10 nanometers to 1000 micrometers, between 10 nanometers to 500 micrometers, between 10 nanometers to 250 micrometers, between 10 nanometers to 100 micrometers, between 10 nanometers to 50 micrometers, between 10 nanometers to 25 micrometers, between 100 nanometers to 1000 micrometers, between 50 nanometers to 1000 micrometers, between 50 nanometers to 500 micrometers, between 50 nanometers to 250 micrometers, between 50 nanometers to 100 micrometers, between 50 nanometers to 50 micrometers, between 50 nanometers to 25 micrometers, between 100 nanometers to 1000 micrometers, between 100 nanometers to 500 micrometers, between 100 nanometers to 250 micrometers, between 100 nanometers to 100 micrometers, between 100 nanometers to 50 micrometers, between 100 nanometers to 25 micrometers, between 250 nanometers to 1000 micrometers, between 250 nanometers to 500 micrometers, between 250 nanometers to 250 micrometers, between 250 nanometers to 100 micrometers, between 250 nanometers to 50 micrometers or even between 250 nanometers to 25 micrometers. Conventional pore size analysis techniques, including imaging of cross-sections (optical microscopy, scanning electron microscopy or atomic force microscopy, for example) and analysis of the image using appropriate software, for example ImageJ software (an open source software, available on-line at http://imagej.net, for example) may be used to statistically analyze the pore size and pore size distribution. X-ray microtomography and mercury porsimetry, bubble point and capillary flow porometry may also be used to analyze the pore size and/or pore size distribution. The open pore structure of the polymeric network structure may facilitate removal of the solvent from the polymeric network structure. The open pore structure of the composite may also facilitate interaction of sound waves with the active material and enhance performance of the composite. For purpose of the present disclosure, the term "polymeric network structure" inherently means that at least a portion of the porosity of the polymeric network structure is free of liquid and solid, e.g. contains one or more gases, such as air. In some embodiments, between 10 percent to 100 percent, between 30 percent to 100 percent, between 50 percent to 100 percent, between 60 percent to 100 percent, between 70 percent to 100 percent, between 80 percent to 100 percent, between 90 percent to 100 percent, between 95 percent to 100 percent, or between 98 percent to 100 percent by volume, of the porosity of the polymeric network structure is free of liquid and solid, e.g. contains one or more gases, such as air.

The density of the polymer matrix composite may vary, depending on the density and amount of acoustically active material used, the density of the polymer(s) of the polymeric network structure, and the porosity of the polymeric network structure. In some embodiments, the density of the polymer matrix composite may be between 0.05 to 3 $g/cm^3$, 0.05 to 2 $g/cm^3$, 0.05 to 1 $g/cm^3$, 0.05 to 0.5 $g/cm^3$, 0.1 to 0.6 $g/cm^3$, 0.1 to 0.5 $g/cm^3$, 0.1 to 0.4 $g/cm^3$ or 0.2 to 0.4 $g/cm^3$.

In some embodiments, the polymer matrix composite may contain a bimodal, trimodal, or higher level pore size distribution. The air flow resistance of the polymer matrix composite may vary, depending on the porosity and pore size of the polymer network, porosity and pore size of the acoustically active material particles, amount of acoustically active material used, and the thickness of the overall composite. In some embodiments, the polymer matrix composite may have an air flow resistance, as measured by the "Method for Air Flow Resistance Test" described herein, of less than 100 seconds/50 mL/500 µm, less than 50 seconds/50 mL/500 µm, less than 25 seconds/50 mL/500 µm, less than 20 seconds/50 mL/500 μm, less than 15 seconds/50 mL/500 μm, or less than 10 seconds/50 mL/500 μm. In some embodiments, the polymer matrix composite may be stretched in one or more directions using conventional processes and methods to modify (e.g., reduce) air flow resistance.

In some embodiments, the polymer matrix composite may take the form of a sheet of material. The thickness of the polymer matrix composite, e.g. the thickness of a polymer matrix composite sheet, is not particularly limited. However, for many applications, e.g. mobile/handheld electronic devices, it may be desirable for this thickness of the polymer matrix composite, e.g. the thickness of a polymer matrix composite sheet, to be below 5000 micrometers, below 3000 micrometers, or below 1000 micrometers, and above 50 micrometers, above 100 micrometers, above 200 micrometers, or above 250 micrometers. In some embodiments, the thickness of the polymer matrix composite, e.g. the thickness of a polymer matrix composite sheet, may be between 250 micrometers and 5000 micrometers, between 250 micrometers and 3000 micrometers, between 250 micrometers and 1000 micrometers, between 250 micrometers and 500 micrometers, between 100 micrometers and 1500 micrometers, between 100 micrometers and 1000 micrometers, between 100 micrometers and 500 micrometers, between 500 micrometers and 2000 micrometers, between 500 micrometers and 1500 micrometers or even between 500 micrometers and 1000 micrometers.

In some embodiments, the polymer matrix composite may be electrically insulating. In some embodiments, the electrical resistivity of the polymer matrix composite may be at least $1 \times 10^{10}$ Ω·m.

Figure 1:
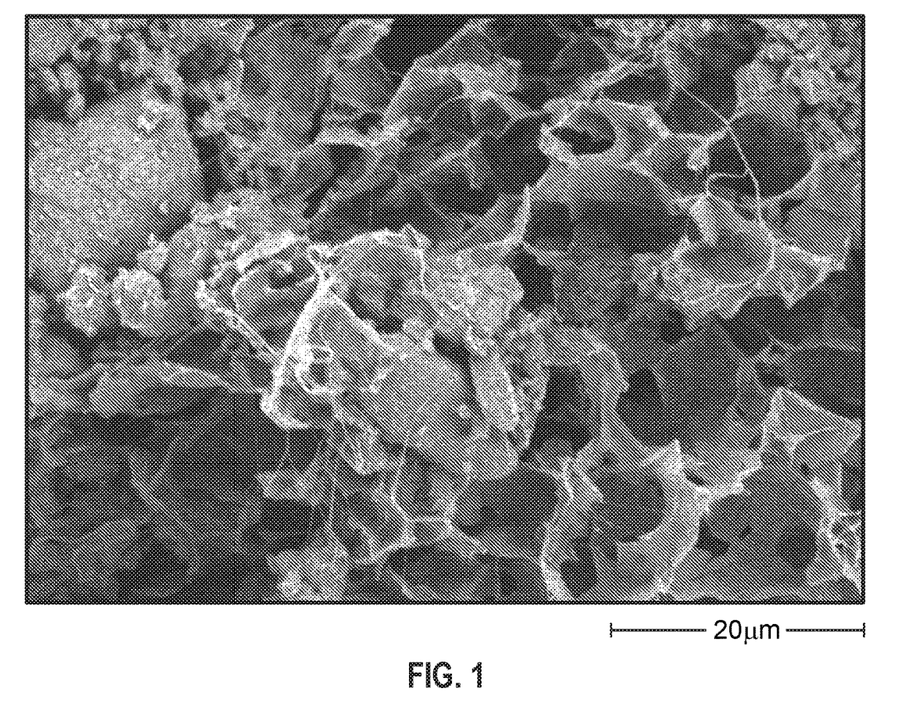
FIGS. 1 and 2 show SEM micrographs of cross-sections of polymer matrix composites of the present disclosure.
Figure 2:
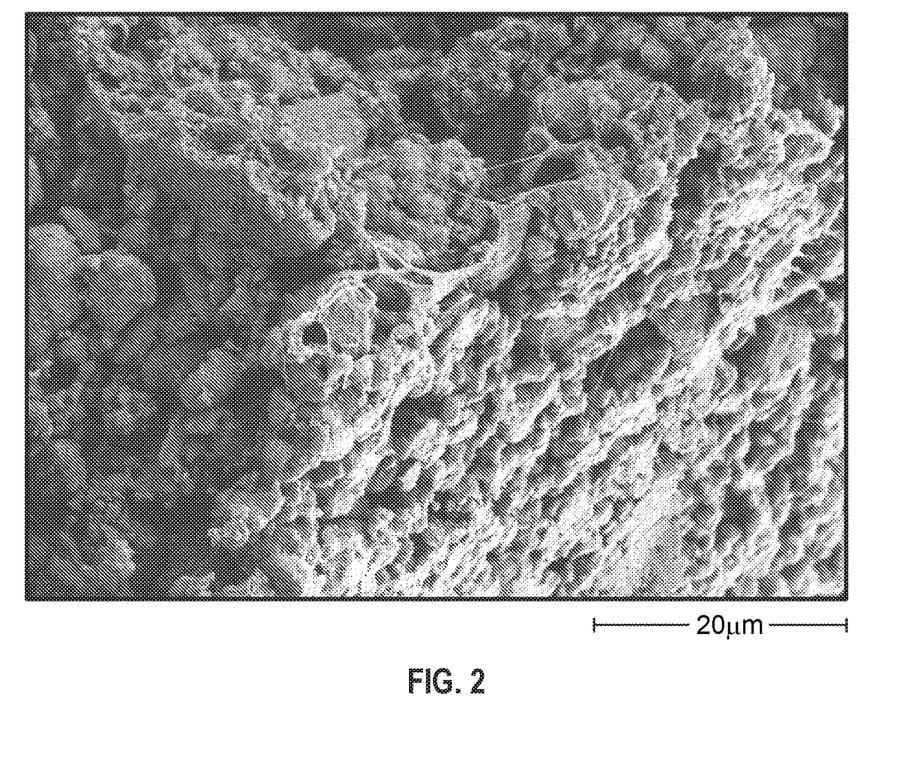

FIGS. 1 and 2 show SEM micrographs of cross-sections of polymer matrix composites of the present disclosure. FIG. 1 shows the cross-section of a cyro-fractured sample of a polymer matrix composites of the present disclosure, and FIG. 2 shows both the cross-section and the plane of the sample of FIG. 1 at an angle. The polymer matrix composites of FIGS. 1 and 2 include an acoustically active material (alumina) in the form of particles having sizes (length of longest dimension) in the range of about 1 micrometers to about 100 micrometers. The polymeric network structure (formed of ultra-high molecular weight polyethylene) is observed between the particles and includes a plurality of interconnected fibrils. In FIGS. 1 and 2, the polymer fibrils, generally, have a length from about 5 micrometers to about 15 micrometers and have a thickness, i.e. width, generally, from about 0.1 micrometer to about 3 micrometers. Based on the process used to fabricate the polymer matrix composites of FIGS. 1 and 2, which involves thermally induced phase separation of a thermoplastic polymer-solvent mixture containing the acoustically active material, followed by extraction of the solvent, the polymeric network structure shown in FIGS. 1 and 2 is a porous polymeric network structure.

In some embodiments, the above described polymer matrix composite materials may be prepared by mixing the thermoplastic polymer(s) and an appropriate solvent(s) to form a miscible thermoplastic polymer-solvent solution, followed by phase separation of the thermoplastic polymer from the solvent, and then removing at least a portion of the solvent. In some embodiments, the process may further include the addition of the acoustically active material to the miscible polymer-solvent solution, prior to phase separation. The polymeric network structure may be formed during the phase separation step of the process. In some embodiments, the polymeric network structure may be produced by an induced phase separation of a miscible thermoplastic polymer-solvent solution. In some embodiments the phase separation may be induced thermally (e.g. Thermally Induced Phase Separation (TIPS) by quenching to lower temperature), chemically (e.g. Solvent Induced Phase Separation (SIPS) by substituting a poor solvent for a good solvent), or change in the solvent ratio (e.g by evaporation of one of the solvent). Other phase separation or pore formation techniques such as discontinuous polymer blends, moisture induced phase separation, vapor induced phase separation, etc can also be used. The polymeric network structure may inherently include porosity, i.e. pores. The pore structure may be open, enabling fluid communication from an interior region of the polymeric network structure to an exterior surface of the polymeric network structure and/or between a first surface of the polymeric network structure and an opposing second surface of the polymeric network structure.

In order to form a miscible thermoplastic polymer-solvent solution, the solvent may dissolve the thermoplastic polymer. Thus, the solvent for a specific thermoplastic polymer may be selected for this purpose. The thermoplastic polymer-solvent mixture may be heated to facilitate the dissolution of the thermoplastic polymer in the solvent. After the thermoplastic polymer has phase separated from the solvent, at least a portion of the solvent may be removed from the polymeric network structure using techniques known in the art, including evaporation of the solvent or extraction of the solvent by a higher vapor pressure, second solvent, followed by evaporation of the second solvent. In some embodiments, at least 10 percent to 100 percent, at least 30 percent to 100 percent, at least 50 percent to 100 percent, at least 60 percent to 100 percent, at least 70 percent to 100 percent, at least 80 percent to 100 percent, at least 90 percent to 100 percent, at least 95 percent to 100 percent or even at least 98 percent to 100 percent by weight of the solvent, and second solvent, if used, may be removed from the polymeric network structure.

The present disclosure also provides a method of making polymer matrix composite sheet having a first major surface including (i) providing a polymer having a number average molecular weight between $5 \times 10^4$ g/mol to $1 \times 10^7$ g/mol, a solvent the polymer is soluble in, and an acoustically active material, (ii) mixing the polymer, solvent and acoustically active material to form a miscible polymer-solvent solution containing the acoustically active material, (iii) forming the polymer-solvent solution containing the acoustically active material into a sheet, (iv) inducing phase separation of the polymer from the solvent, and (v) removing at least a portion of the solvent, thereby forming a polymer matrix composite sheet having a polymeric network structure and an acoustically active material distributed within the polymeric network structure.

The solvent may be selected such that it is capable of dissolving the polymer and forming a miscible polymer-solvent solution. Heating the solution to an elevated temperature may facilitate the dissolution of the polymer. In some embodiments, the mixing step is conducted at a temperature between 20° C. to 350° C. The acoustically active material may be added at any or all of the mixing steps, before the polymer is dissolved, after the polymer is dissolved, or at any time therebetween.

The solvent, e.g. a first solvent, is not particularly limited, except in that it may be selected such that it forms a miscible polymer-solvent solution. The solvent may be a blend of two or more individual solvents. In some embodiments, when the polymer is a polyolefin, e.g. at least one of polyethylene and polypropylene, the solvent may be selected at least one of mineral oil, tetralin, decalin, 1,2-orthodichlorobenzene, cyclohexane-toluene mixture, dodecane, paraffin oil/wax, kerosene, p-xylene/cyclohexane mixture (1/1 wt/wt), champhene, 1,2,4 trichlorobenzene, octane, orange oil, vegetable oil, castor oil and palm kernel oil. In some embodiments, when the polymer is polyvinylidene fluoride, the solvent may be at least one of ethylene carbonate, propylene carbonate and 1,2,3 triacetoxypropane. The solvent may be removed by evaporation, high vapor pressure solvents being particularly suited to this method of removal. However, if the first solvent has a low vapor pressure, a second solvent, of higher vapor pressure, may be used to extract the first solvent, followed by evaporation of the second solvent. For example, in some embodiments, when mineral oil is used as a first solvent, isopropanol at elevated temperature, e.g. about 60° C., or a blend of methyl nonafluorobutyl ether ($C_4F_9OCH_3$), ethylnonafluorobutyl ether ($C_4F_{90}C_2H_5$), and trans-1,2-dichloroethylene (available under the trade designation NOVEC 72DE from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature, e.g. about 60° C., may be used as the second solvent. In some embodiments, when ethylene carbonate is used as the first solvent, water may be used as the second solvent.

After dissolving the polymer, in solvent (that allows formation of miscible thermoplastic-solvent solution), including dispersed acoustically active material to form a blended mixture, it may be formed into a sheet. The forming of the blended mixture into a sheet may be conducted prior to the solidification of the polymer in the phase separation step (but, in some embodiments, may be alternatively or additionally conducted during and/or after the phase separation step). The sheet-forming step may be conducted using techniques known in the art, including, but not limited to, knife coating, roll coating, e.g. roll coating through a defined nip, and extrusion, e.g. extrusion through a die e.g. extrusion through a die having the appropriate sheet dimensions, i.e. width and thickness of the die gap. In one embodiment, the mixture may have a paste like consistency and be formed into a sheet by extrusion, e.g. extrusion through a die having the appropriate sheet dimensions, i.e. width and thickness of the die gap.

After forming the mixture into a sheet where the thermoplastic polymer is miscible in its solvent, the polymer may then be induced to phase separate. Several techniques may be used to induce phase separation, including, but not limited to, at least one of thermally induced phase separation or solvent induced phase separation. Thermally induced phase separation may occur when the temperature at which induced phase separation is conducted is lower than the mixing temperature of the mixing step of the polymer, solvent, and acoustically active material. This may be achieved by cooling the miscible polymer-solvent solution, if the mixing step is conducted near room temperature, or by first heating the miscible polymer-solvent solution to an elevated temperature (either during mixing or after mixing), followed by decreasing the temperature of the miscible polymer-solvent solution, thereby inducing phase separation of the thermoplastic polymer. In both cases the cooling step may cause phase separation of the polymer from the solvent. Solvent induced phase separation can be conducted by adding a second solvent, a poor solvent for the polymer, to the miscible polymer-solvent solution or may be achieved by removing at least a portion of the solvent of the miscible polymer-solvent solution, e.g. evaporating at least a portion of the solvent of the miscible polymer-solvent solution, thereby inducing phase separation of the polymer. Combination of phase separation techniques, e.g. thermally induced phase separation, and solvent induced phase separation, may be employed. Thermally induced phase separation, may be advantageous, as it also facilitates the dissolution of the polymer when the mixing step is conducted at an elevated temperature. In some embodiments, the inducing phase separation step is conducted at a temperature that is between 5° C. to 300° C. below the mixing step temperature, between 5° C. to 250° C. below the mixing step temperature, between 5° C. to 200° C. below the mixing step temperature, between 5° C. to 150° C. below the mixing step temperature, between 15° C. to 300° C. below the mixing step temperature, between 15° C. to 250° C. below the mixing step temperature, between 15° C. to 200° C. below the mixing step temperature, between 15° C. to 130° C. below the mixing step temperature, or between 25° C. to 110° C. below the mixing step temperature.

After inducing phase separation, at least a portion of the solvent may be removed, thereby forming a porous polymer matrix composite sheet having a polymeric network structure and an acoustically active material distributed within the thermoplastic polymer network structure. Optionally after in inducing phase separation, the solvent filled structure may be stretched thereby forming a porous polymer matrix composite sheet having a polymeric network structure, solvent, and an acoustically active material distributed within the thermoplastic polymer network structure.

The solvent may be removed by evaporation, high vapor pressure solvents being particularly suited to this method of removal. However, if the first solvent has a low vapor pressure, a second solvent, of higher vapor pressure, may be used to extract the first solvent, followed by evaporation of the second solvent. In some embodiments, at least 10 percent to 100 percent, at least 30 percent to 100 percent, at least 50 percent to 100 percent, at least 60 percent to 100 percent, at least 70 percent to 100 percent, at least 80 percent to 100 percent, at least 90 percent to 100 percent, at least 95 percent to 100 percent or even at least 98 percent to 100 percent by weight of the solvent is removed from the thermoplastic polymer network structure.

After inducing phase separation, the formed polymeric network structure may be stretched or compressed to, for example, tune the air flow resistance of the polymer matrix composite. Stretching or compression of the polymer matrix composite may be achieved by conventional calendaring or tentering processes known in the art.

The polymer matrix composites described herein can have various applications including as acoustically active materials. In some embodiments, an electronic device (e.g., mobile phone, tablet, laptop) may include an acoustic device (e.g., speaker, microphone) that includes the polymer matrix composites of the present disclosure (e.g., in a cavity thereof). The polymer matrix composites are capable of lowering a resonant frequency of the cavity when the resonant frequency is in a range, for example, from about 50 Hz to about 1500 Hz. In some embodiments, the polymer matrix composites can be present in the cavity in the form of, for example, a film or mat that can be electrically insulative and hydrophobic. The polymer matrix composites described herein can also be used as an acoustically active material in, for example, medical devices, automobile devices, communication devices such as headsets, audio-video devices, and the like.

LISTING OF EMBODIMENTS

1. A polymer matrix composite comprising:
   a porous polymeric network structure; and
   a plurality of acoustically active particles distributed within the polymeric network structure;
   wherein the weight fraction of the acoustically active particles is between 0.80 and 0.99, based on the total weight of the polymer matrix composite; and
   wherein the polymer matrix composite has an air flow resistance of less than 100 seconds/50 mL/500 µm.
2. The polymer matrix composite of embodiment 1, wherein the polymer matrix composite has a density of between 0.05 to 1 g/cm$^3$.
3. The polymer matrix composite of any one of the previous embodiments, wherein the polymer matrix composite has a porosity of at least 50%.
4. The polymer matrix composite of any one of the previous embodiments, wherein the acoustically active particles comprise acoustically active metal oxide particles.
5. The polymer matrix composite of any one of the previous embodiments, wherein the acoustically active metal oxide particles have an average particle size of 100 nm to 20
6. The polymer matrix composite of any one of the previous embodiments, wherein the acoustically active metal oxide particles have average particle size between 100 nm and 20 microns.
7. The polymer matrix composite of any one of the previous embodiments, wherein the acoustically active metal oxide particles have a specific surface area of at least 50 m$^2$/g.
8. The polymer matrix composite of any one of the previous embodiments, wherein the acoustically active metal oxide particles are hydrophobic.
9. The polymer matrix composite of any one of the previous embodiments, wherein the porous polymeric network structure comprises polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.
10. The polymer matrix composite of any one of the previous embodiments, wherein the porous polymeric network structure comprises a plurality of interconnected fibrils.
11. The polymer matrix composite of any one of the previous embodiments, wherein the porous polymeric network structure comprises a polymer having a number average molecular weight of 5×10$^4$ g/mol to 1×10$^7$ g/mol.
12. The polymer matrix composite of any one of the previous embodiments, wherein the polymer matrix composite is in the form of a sheet having a thickness of between 50 micrometers and 5000 micrometers.
13. The polymer matrix composite of any one of the previous embodiments, wherein the porous polymeric network structure is produced by an induced phase separation of a miscible thermoplastic polymer-solvent solution and, optionally, wherein the induced phase separation is at least one of thermally induced phase separation and solvent induced phase separation.
14. A method of making polymer matrix composite, the method comprising:
   mixing a thermoplastic polymer, a solvent the thermoplastic polymer is soluble in, and a plurality of acoustically active particles to form a miscible thermoplastic polymer-solvent solution;
   inducing phase separation of the thermoplastic polymer from the solvent; and
   removing at least a portion of the solvent, thereby forming a polymer matrix composite,
   wherein the polymer matrix composite has an air flow resistance of less than 100 seconds/50 mL/500 µm.
15. The method of embodiment 14, wherein the inducing phase separation step includes at least one of thermally induced phase separation and solvent induced phase separation.
16. The method of any one of embodiments 14-15, wherein the mixing step is conducted at temperature between 20° C. to 350° C.
17. The method of any one of embodiments 14-15, wherein the inducing phase separation step is conducted at a temperature that is between 5° C. to 300° C. below the mixing step temperature.
18. The method of any one of embodiments 14-17, further comprising stretching or compressing the polymer matrix composite.
19. An electronic device comprising an acoustic device, the acoustic device comprising the polymer matrix composite of any one of embodiments 1-13.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

The following examples are offered to aid in the understanding of the present disclosure and are not to be construed as limiting the scope thereof. Unless otherwise indicated, all parts and percentages are provided on a weight basis. All materials were obtained from Sigma-Aldrich Corporation, USA and used as received, unless otherwise indicated.

Test Methods

Method for Impedance Test

The resonance frequency was obtained using standard Thiele-Small parameter analysis as described in Small, R. H., "Closed-Box Loudspeaker Systems", J. Audio Eng. Soc., vol. 20, pp. 798-808 (December 1972) of a Knowles Electronics 2403-260-00001 11×15×3.5 mm speaker (available from Knowles Electronics, Itasca, Ill., US) connected to a 0.93 cm$^3$ cavity. A DATS V2 Dayton Audio Test System (available from Dayton Audio, Springboro, Ohio, US) was attached to the speaker and run to collect impedance as a function of frequency in the audio range (20-20,000 Hz). The resonant frequency was identified as the frequency at which the impedance peaked. The resonance frequency was collected for the speaker in contact with the unfilled 0.93 cm$^3$ cavity, and compared to the system resonance with the cavity filled with the test material. A resonance frequency shift was calculated by subtracting the resonance frequency of the filled speaker module from the resonance frequency of the empty speaker module. A positive value of resonance frequency shift refers to a reduction in resonance frequency, i.e. a shift to lower frequency.

Method for Sound Pressure Level (SPL) Test

Figure 3:
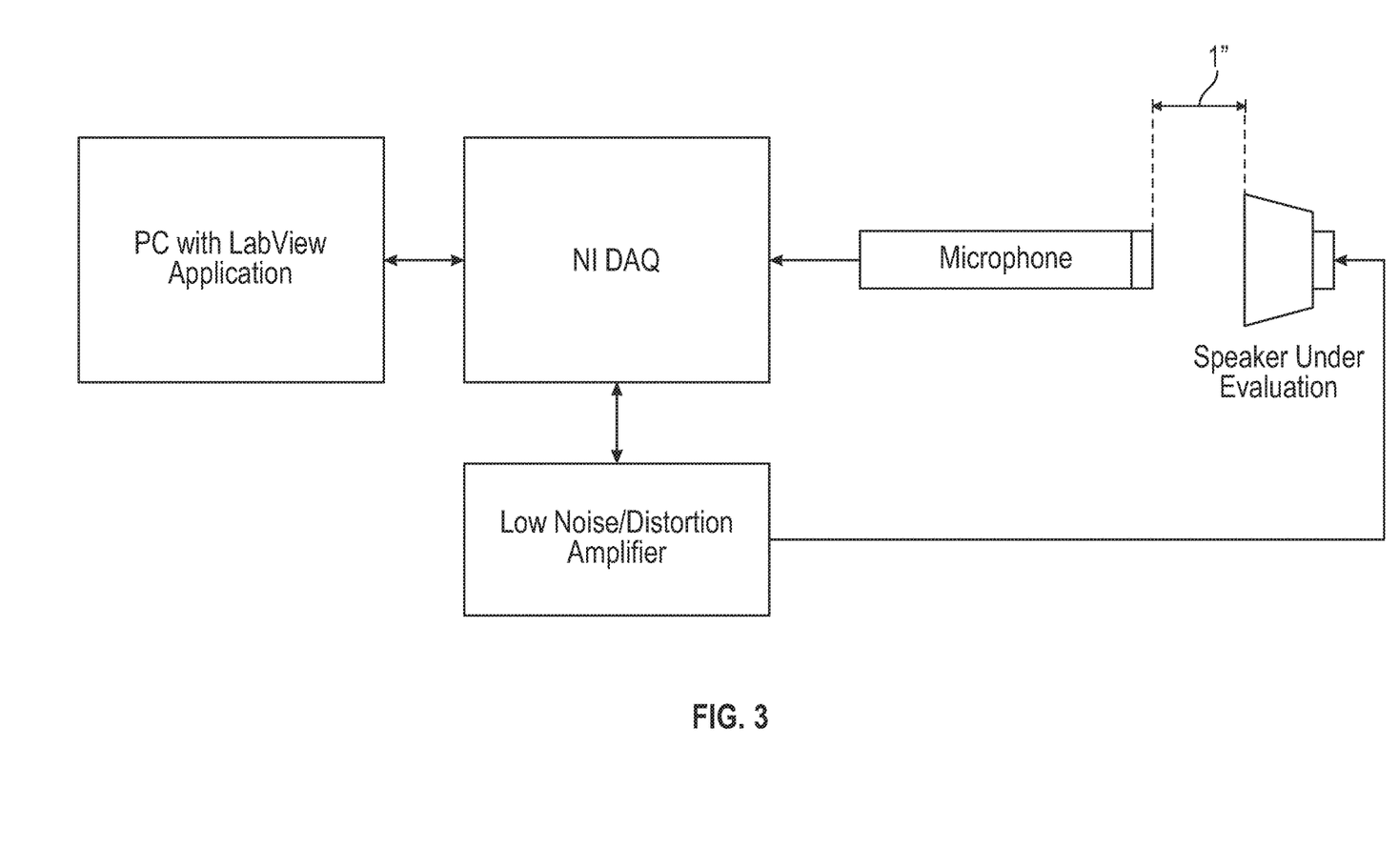
FIG. 3 is a schematic of a test configuration to determine the Sound Pressure Level (SPL) of embodiments of the present invention.

The sound pressure level (SPL) response was obtained by driving a model 2403-260-00001 speaker (available from Knowles Electronics, Itasca, Ill., US) connected to a 0.93 cm$^3$ cavity. The driving voltage was approximately 400 MV$_{rms}$ which was supplied in the form of a band-limited chirp from 100-3200 Hz. The voltage profile was identical for each material tested, and was generated by a PC-controlled running custom LABVIEW 2016 (National Instruments, Austin, Tex., US) procedures based upon the Advanced Signal Processing Toolkit Time-Series Analysis module) 24-bit Analog I/O DAQ (National Instruments model NI-USB-4431, National Instruments, Austin, Tex., US) amplified with a low noise/distortion audio amplifier (Audioengine model N22, Audioengine, Austin, Tex., US). This system was also used to record the SPL from a condenser microphone (G.R.A.S. model 42AB, G.R.A.S. Sound & Vibration, Twinsburg, Ohio, US) that was positioned approximately 2.54 cm from the fixture. A schematic of the test configuration is provided in FIG. 3. An average SPL improvement was calculated by first collecting the SPL curve for the speaker module with empty cavity and then collecting the SPL curve for the same speaker module with test material in the cavity. The SPL curve obtained for the empty speaker module was subtracted from the SPL curve obtained for the filled speaker module, and the average SPL difference was calculated for the ranges of 200-500 Hz or 300-350 Hz.

Method for Air Flow Resistance Test

Air flow resistance was measured using a Gurley Model 4110 densometer with a Model 4320 timer (Gurley Precision Instruments, Troy, N.Y., US). A sample was clamped in the tester. The timer and photo eye were reset and the cylinder was released allowing air to pass through a 1 square inch (6.5 cm$^2$) circle with a constant force of 4.88 inches of water (1215 N/m$^2$). The time to pass 50 mL of air was recorded. The air flow resistance was normalized to that of a 500 μm thick film by dividing by the film thickness in microns and multiplying by 500 microns. Film thickness was measured as described below in the section "Method for Density and Porosity."

Method for Bubble Point Pressure

Bubble point pressure is a commonly used technique to characterize the largest pore in a porous membrane. Discs 47 mm in diameter were cut and samples were soaked in isopropyl alcohol to fully fill and wet out the pores within the sample. The wet samples were then placed in a holder (47 mm Stainless Holder Part #2220, Pall Corporation, Port Washington, N.Y., US). Pressure was slowly increased on the top of the sample using a pressure controller and gas flow was measured on the bottom with a gas flow meter. The pressure was recoded when there was a significant increase in flow from the baseline flow rate. This was reported as the bubble point pressure (pounds per square inch, psi). This technique is a modification to ASTM F316-03, "Standard Test Methods for Pore Size Characteristics of Membrane Filters by Bubble Point and Mean Flow Pore Test" and includes an automated pressure controller and flow meter to quantify when the bubble point pressure has been reached. The pore size was calculated per the ASTM using the following equation:

Limiting Pore Diameter (μm)=(Surface Tension in dynes/cm*0.415)/(Pressure in psi)

The factor of 0.415 was included since the pressure was in units of psi. A surface tension of 21.6867 dynes/cm was used for isopropyl alcohol.

Method for Density and Porosity

The density of a sample was calculated in a method similar to ASTM F-1315-17, "Standard Test Method for Density of a Sheet Gasket Material" by cutting a 47 mm diameter disc, weighing the disc on an analytical balance of suitable resolution (typically 0.0001 grams), and measuring the thickness of the disc on a thickness gauge (TMI model 49-70 (available from Testing Machines, Inc. New Castle, Del., US) or similar with dead weight of 7.3 psi (50.3 MPa) and a flat anvil of 0.63 in (2.54 cm) diameter, with a dwell time of approximately 3 seconds and a resolution of +/−0.0001 inches). The density could then be calculated by dividing the mass by the volume, which is calculated from the thickness and diameter of the sample. With the known densities and weight fractions of the components of the polymer matrix composite, the theoretical density of the polymer matrix composite was calculated by the rule of mixtures. Using the theoretical density and the measured density, the percent void fraction was calculated as:

Percent Void Fraction=[1−(measured density/theoretical density)]×100

Sample Preparation

Example 1

A measured amount of mineral oil was added to a 40-gallon high shear mixer (Ross VERSAMIX part number PVM-40 from Charles Ross and Son Company, Hauppauge, N.Y., US). A charge of powdered ultra-high molecular weight polyethylene (GUR-2126 UHMWPE, Celanese, Irvine, Tex., US) was then added to the mineral oil and the two were mixed until the powder was wet out and well dispersed. Multiple charges of gamma alumina powder (VERSAL V-250, UOP LLC, Des Plaines, Ill., US) were then added and mixed until a ratio of mineral oil to alumina plus UHMWPE ratio of 65.05:34.95 by weight and the ratio of alumina to UHMWPE was 93.45:6.55 by weight was achieved. The solution was transferred to a 40-gallon double planetary mixer (Ross Double Planetary part number HDM-40 from Charles Ross and Son Company Hauppauge, N.Y., US) to finish incorporating the alumina and mixed until it was a well dispersed paste like consistency. The paste was then transferred from the mixer to five gallon pails. Using a pail unloader pump with flow control plate (X20 Graco Inc. Minneapolis, Minn., US), the paste was fed into the open barrel zone #2 of a twin screw extruder (25 mm co-rotating twin screw extruder, Berstorff, Germany) at ~192° C., and 150 rpm screw speed. Additional mineral oil was pumped into the extruder open barrel zone #2 using a gear pump (Zenith Pumps, Monroe, N.C., US) and Coriolis mass flow meter (Micromotion mass flow meter, Emerson Electric Co, St. Louis, Mo., US) to adjust the ratio of mineral oil to alumina plus UHMWPE ratio from 65.05:34.95 to 71:29 by mass. The extruder was connected to an 8 inch (20.3 cm) drop die (Nordson Extrusion Die Industries, Chippewa Falls, Wis., US) at 188° C. The hot film coming from the die was quenched on a smooth casting wheel at 71° C. The speed of the casting wheel was set at 4.6 feet per minute (1.4 m/min). The mineral oil in the films was then extracted with 3M NOVEC 72DE (3M Company, St. Paul, Minn., US) by soaking 5 inch×10 inch (12.7 cm×25.4 cm) films three times for 20 minutes each time. The NOVEC 72DE was subsequently allowed to evaporate from each sample by hanging the film inside a fume hood. This produced the film for Example 1.

The resulting polymer matrix composite film had a thickness of 20.7 mils (0.525 mm), a density of 0.37 g/cm$^3$, a porosity of 88.5% (theoretical density of 3.24 g/cm$^3$ based on theoretical density of UHMPE of 0.94 g/cm$^3$ and theoretical density of Versal V-250 gamma alumina of 3.4 g/cm³), a maximum pore size of 1.55 microns, and air flow resistance 16.2 seconds/50 mL/500 μm.

Figure 4A:
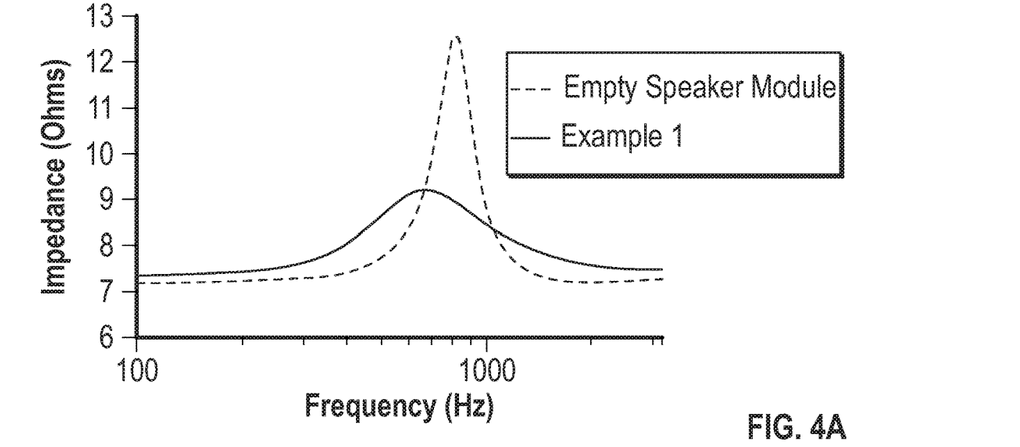
Figure 4B:
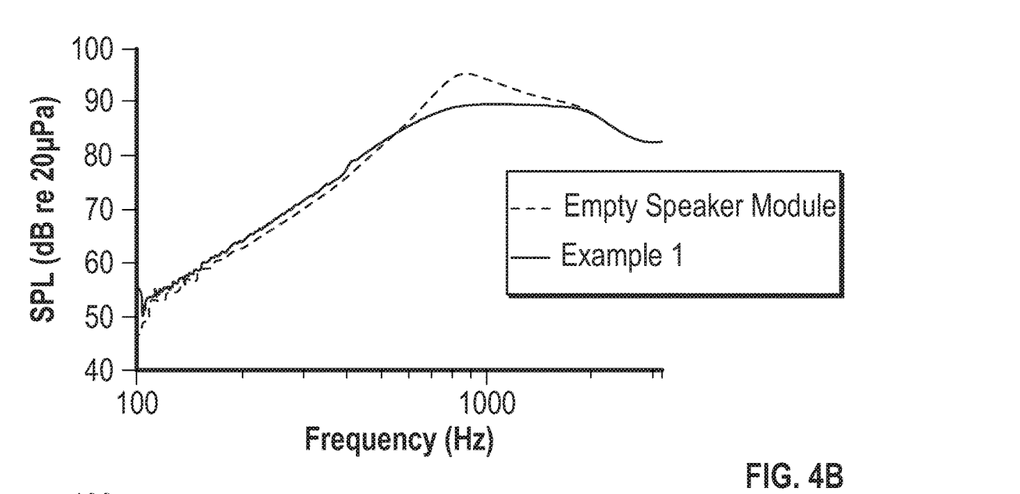
Figure 4C:
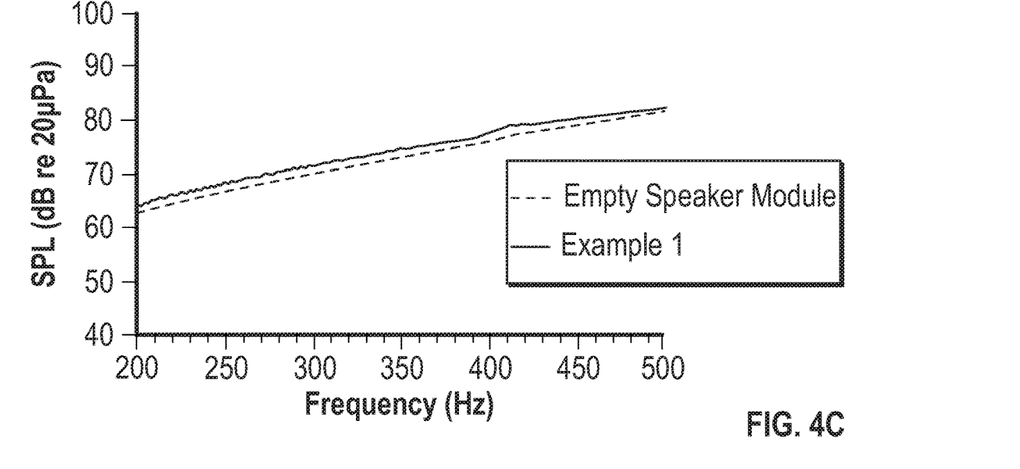

The film was cut to fit the dimensions of the speaker module described previously in the sections "Method for Impedance Test" and "Method for Sound Pressure Level (SPL) Test." Up to 12 layers were stacked to fill the speaker module. The results are provided in FIGS. 4(a), 4(b) and 4(c). The resonance frequency shift was 146.7 Hz, and the average SPL improvement over the frequency range of 200 to 500 Hz was 1.22 dB with 12 layers in the speaker module.

Example 2

The polymer matrix composite film of Example 1 was stretched 1.5 times in the machine and 1.5 times in the transverse direction at 120° C. using a laboratory stretching machine (KARO, Bruckner Maschinenbau GmbH & Co. KG, Siegsdorf, Germany).

The resulting polymer matrix composite film had a thickness of 16.4 mils (0.417 mm), density of 0.36 g/cm³, porosity of 88.9%, max pore size of 1.27 microns, and air flow resistance of 12.6 seconds/50 mL/500 μm.

Figure 5A:
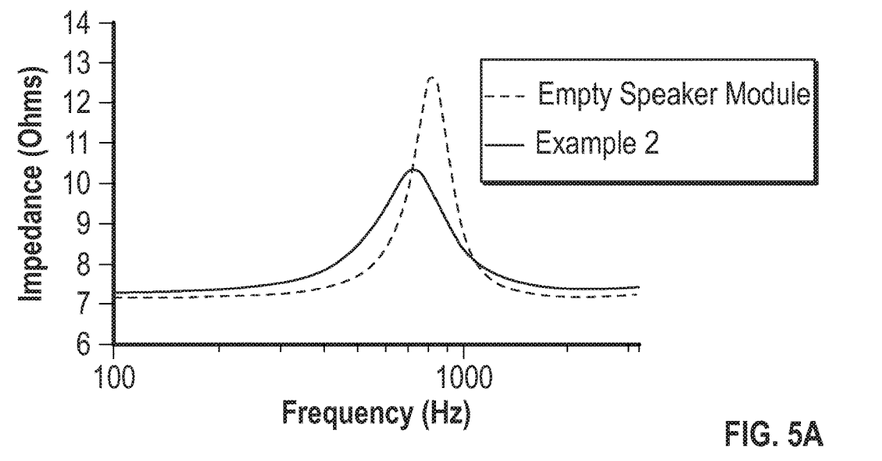
Figure 5B:
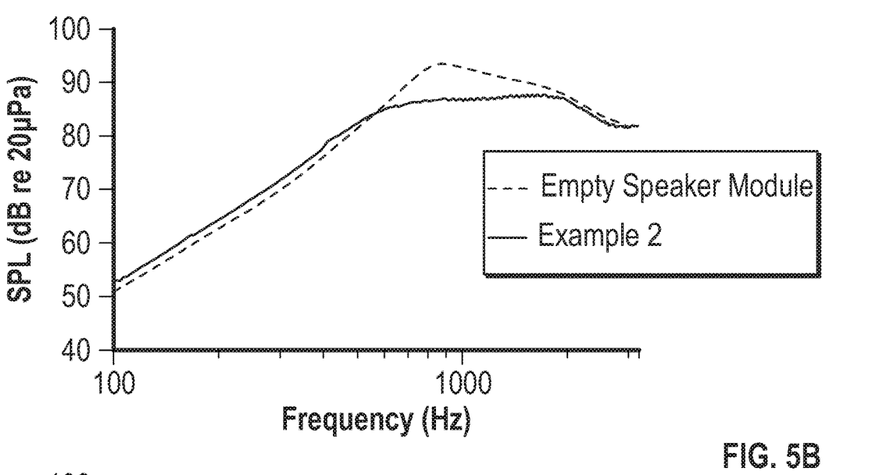
Figure 5C:
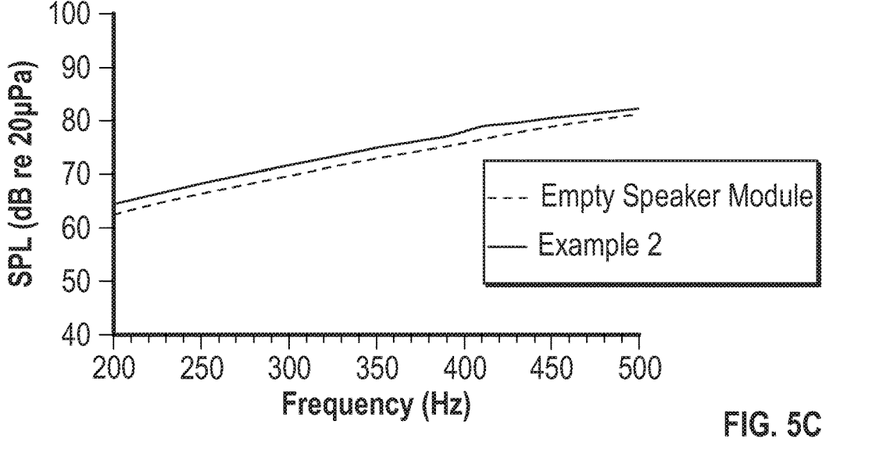

The film was cut to fit the dimensions of the speaker module described above in the sections "Method for Impedance Test" and "Method for Sound Pressure Level (SPL) Test." Up to 17 layers were stacked to fill the speaker module. The results are shown in Figures FIGS. 5(a), 5(b) and 5(c). The resonance frequency shift was 95.5 Hz, and the average SPL improvement over the frequency range of 200 to 500 Hz was 1.69 dB with 17 layers in the speaker module.

Comparative Example A

Comparative Example A was made in the same manner as Example 1 except additional UHMWPE was mixed into the oil using a small high shear lab mixer (TURRAX, IKA Works, Inc, Wilmington, N.C., US) which was pumped into the extruder using the gear pump and flow meter. The formulation was adjusted to a ratio of 85:15 by weight alumina:UHMWPE and 71:29 mineral oil:(alumina plus UHMWPE). The temperature of the casting wheel was reduced to 49° C. and the casting wheel speed was adjusted to 5.5 fpm (1.67 m/min).

The resulting polymer matrix composite film had a thickness of 20.9 mils (0.531 mm), density 0.38 g/cm³, porosity of 87.5%, max pore size of 0.53 microns and air flow resistance of 109.9 seconds/50 mL/500 μm.

Figure 6A:
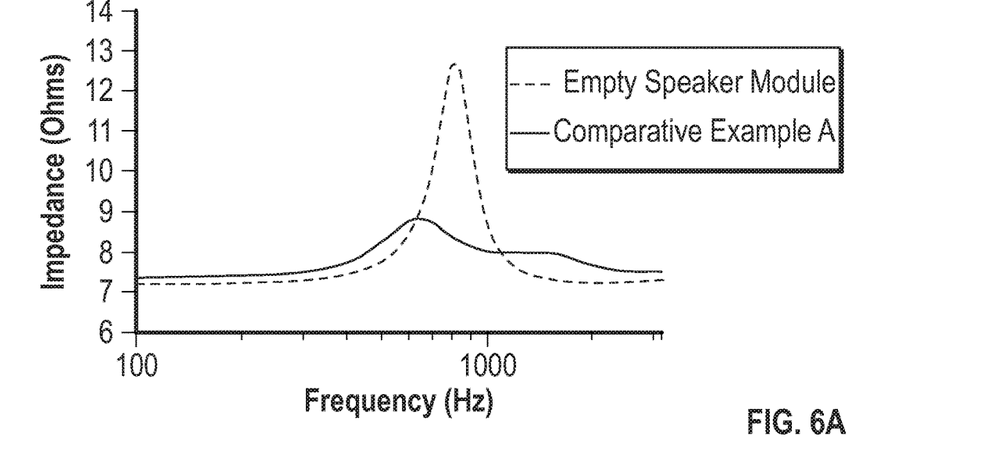
Figure 6B:
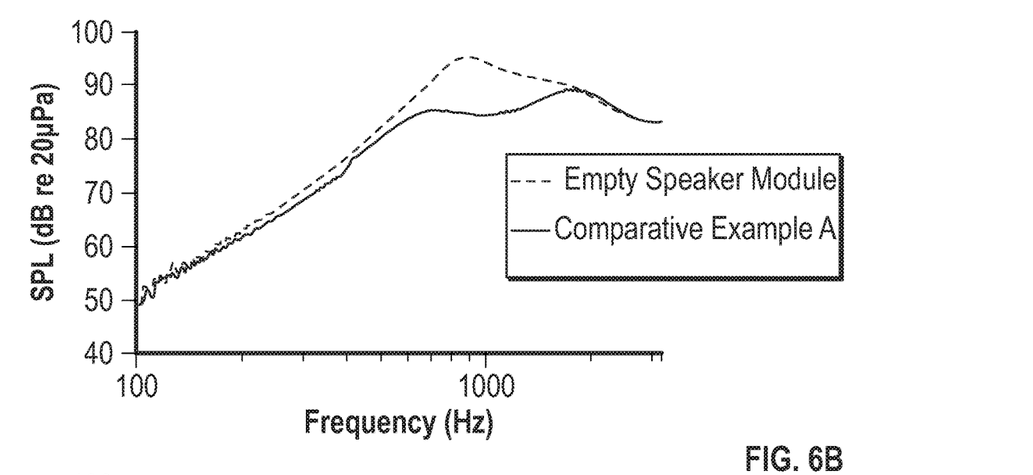
Figure 6C:
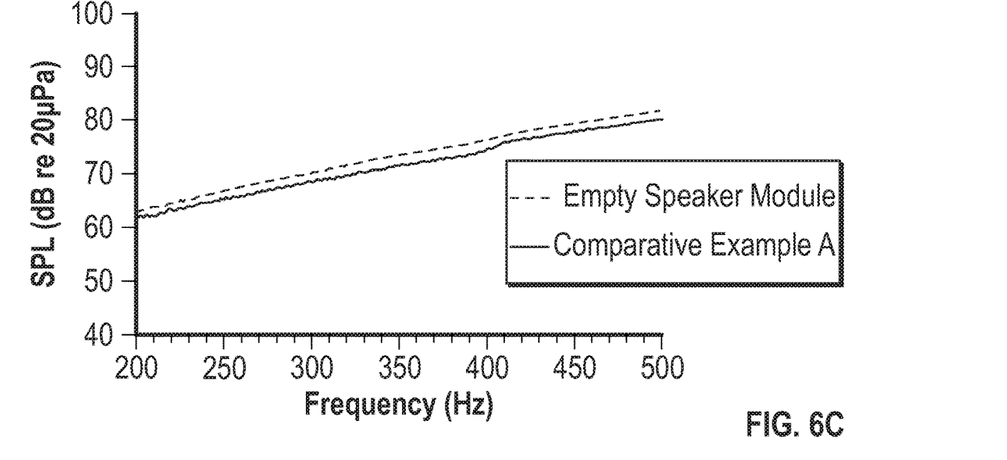

The film was cut to fit the dimensions of the speaker module described in "Method for Impedance Test" and "Method for Sound Pressure Level (SPL) Test." Up to 13 layers were stacked to fill the speaker module. Test results are shown in FIGS. 6(a), 6(b) and 6(c). Two resonance frequencies were found, one with a shift of 173.6 Hz and one with a shift of −591.4 Hz, and the average SPL shift over the frequency range of 200 to 500 Hz was −1.68 dB.

Example 3

The polymer matrix composite film of Comparative Example A was stretched 1.5 times in the machine and 1.5 times in the transverse direction at 120° C. using a laboratory stretching machine (KARO, Bruckner Maschinenbau GmbH & Co. KG, Siegsdorf, Germany)

The resulting polymer matrix composite film had a thickness of 20.7 mils (0.526 mm), density of 0.25 g/cm³, porosity of 90.8%, max pore size of 1.10 microns, and air flow resistance of 23.5 seconds/50 mL/500 μm.

Figure 7A:
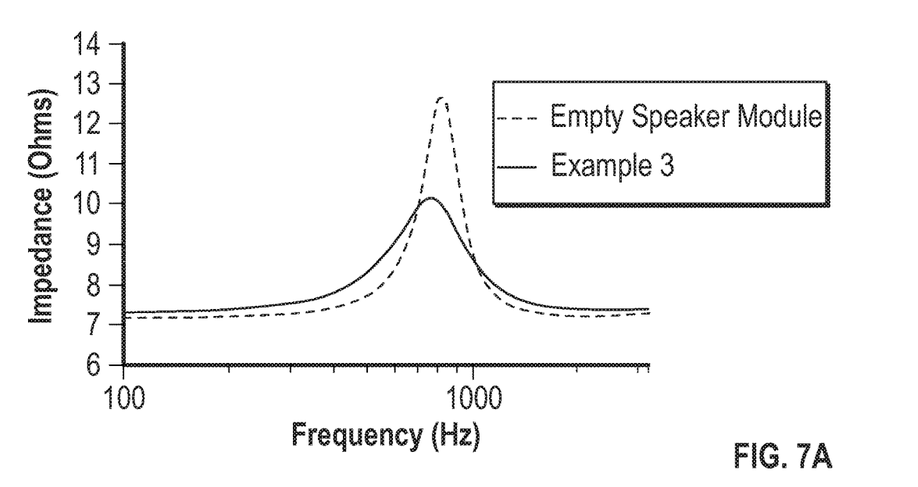
Figure 7B:
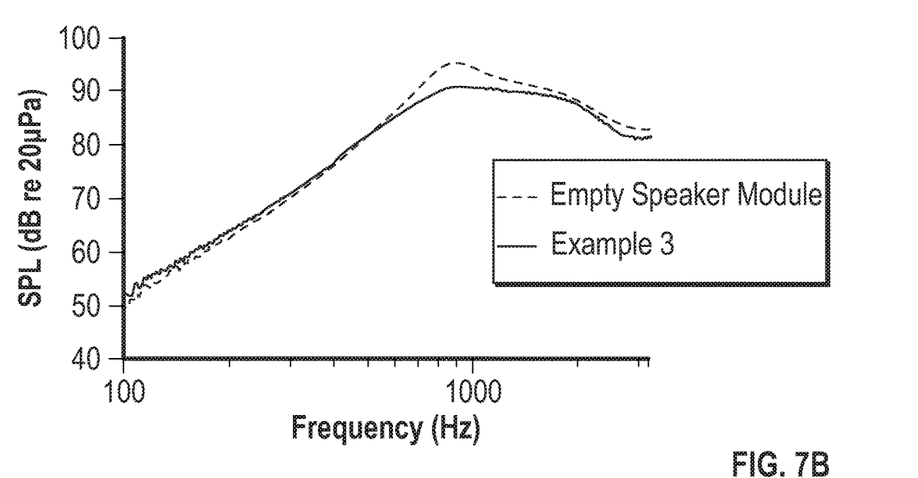
Figure 7C:
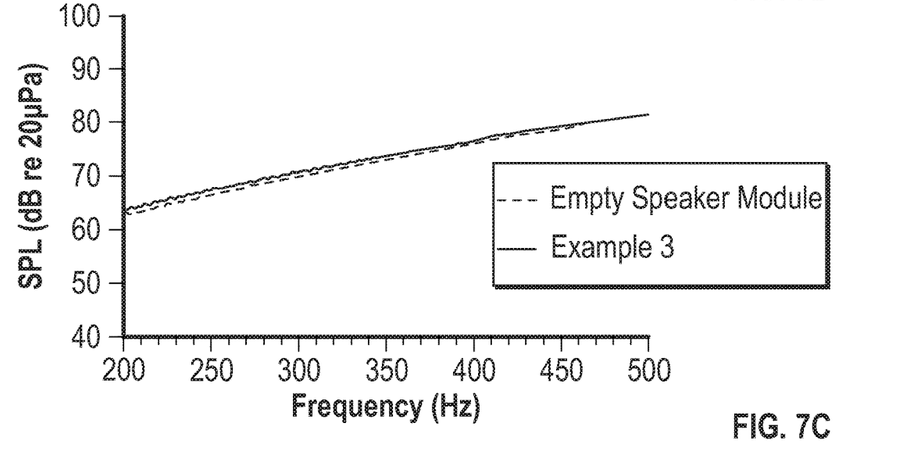

The film was cut to fit the dimensions of the speaker module described in "Method for Impedance Test" and "Method for Sound Pressure Level (SPL) Test." Up to 14 layers were stacked to fill the speaker module. FIGS. 7(a), 7(b) and 7(c) show test results of as a function of frequency for Example 3. The maximum resonance frequency shift was 52.5 Hz with 14 layers in the speaker module, and the maximum average SPL improvement over the frequency range of 200 to 500 Hz was 0.57 dB with 12 layers in the speaker module.

Example 4

Alumina particles (obtained under the trade designation "VERSAL V-250" from UOP LLC, Des Plaines, Ill., US) were heat-treated by placing them in an alumina crucible and heating them in a pre-heated kiln (obtained under the trade designation "DRAGON 24" from Paragon Industry, Mesquite, Tex., US) at 750° C. for 1 hour after which they were removed and allowed to cool. The heat-treated particles were then silane-treated as follows. A 12-L round bottom flask fitted with mechanical stirring, was made inert with nitrogen and a thermocouple-controlled heating mantle was charged with 4800 grams of deionized water and 1200 grams of ethanol (obtained from JT Baker, Center Valley, Pa., US). With moderate agitation, 1500 grams of the heat-treated alumina particles were added slowly to form a uniform slurry. The pH of the resulting mixture was adjusted to a pH of 9 to 10 using 1.0 N NaOH (obtained from VWR, Radnor, Pa., US). Then 26.03 grams of isooctyl silane (obtained as "SILRES BS1316" from Wacker Chemie AG, Munich, Germany) was added to the mixture. The mixture was heated to 80° C. with stirring for 16 hours. The mixture was cooled and the solids were collected by filtration using a Buchner funnel. The solids were washed with 380 grams of ethanol then transferred to an aluminum pan. The solids were dried in an oven overnight at 140° C.

A plastic mixing cup (obtained under the trade designation "MAX 60 CUP for a speed mixer obtained under the trade designation "SPEEDMIXER DAC600.2 VAC-P," both from FlackTek, Inc., Landrum, S.C., US) was charged with 1.3 grams of UHMWPE ("GUR-2126")), and 21.7 grams of paraffin (obtained under the trade designation "ISOPAR G" from Brenntag Great Lakes, Inc., Wauwatosa, Wis., US) and was mixed at 1000 rpm for 15 seconds, followed by 2200 rpm for 120 seconds.

8 grams of the silane treated alumina particles were added slowly to the plastic mixing cup ("MAX 60 CUP") and stirred by hand with a spatula until a uniform slurry was obtained. The slurry in the plastic mixing cup ("MAX 60 CUP") (with vented lid applied) was then run on the speed mixer at 800 rpms for 15 seconds at 720 torr followed by 800 rpm for 180 seconds at 30 torr. After mixing, the slurry was applied with a scoop at room temperature (about 25° C.) to a 3-mil (75-micrometer) heat stabilized polyester (PET) liner then another 3-mil (75-micrometer) heat stabilized PET liner was applied on top to sandwich the slurry. The slurry was then spread between the PET liners by using a notch bar set to a gap of 30 mils (762 micrometers). The notch bar rails were wider than the PET liner to obtain an effective wet film thickness of 24 mils (610 micrometers). Progressive multiple passes with increasing downward pressure of the notch bar were used to flatten the slurry. The sandwiched, formed slurry was placed on an aluminum tray and placed in an oven at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.) forming a solvent filled polymer matrix composite. Both the top and bottom liners were removed exposing the polymer matrix composite to air. The polymer matrix composite was then placed back on a PET liner on the tray and the tray inserted into an oven at 107° C. (225° F.) for two hours and ten minutes. After evaporation of the solvent, the polymer matrix composite was removed from the oven, allowed to cool to ambient temperature, and characterized.

The resulting polymer matrix composite was 21.6 mils (549 micrometers) thick and had a measured density of 0.32 g/cm$^3$ and a porosity of 91% (as determined by the "Method for Density and Porosity"), a Gurley air flow of 7.7 sec/50 cm$^3$ (as determined by the "Method for Air Flow Resistance Test"), and a pore size of 2.8 micrometers (as determined by the "Method for Bubble Point Pressure.")

The film was cut to fit the dimensions of the speaker module described previously in the sections "Method for Impedance Test" and "Method for Sound Pressure Level (SPL) Test." Up to 15 layers were stacked to fill the speaker module. The resonance frequency shift was 261 Hz, and the average SPL improvement over the frequency range of 300 to 350 Hz was 2.66 dB with 15 layers in the speaker module.

The resulting polymer matrix composite was then exposed to 85° C. and 85% relative humidity for 10 days. The sample was then retested for acoustic performance and had a resonance frequency shift of 190 hertz (as determined by the "Method for Impedance Test"), and a sound pressure level of 2.65 decibels over the frequency range of 300-530 Hz (as determined by the "Method for Sound Pressure Level (SPL) Test").

Although specific embodiments have been illustrated and described herein for purposes of description of some embodiments, it will be appreciated by those of ordinary skill in the art that a wide variety of alternate and/or equivalent implementations may be substituted for the specific embodiments shown and described without departing from the scope of the present disclosure.

What is claimed:

1. A polymer matrix composite comprising:
   a porous polymeric network structure, the porous polymeric network structure comprising a plurality of interconnected fibrils having an average width of between 10 nm and 100 nm, 100 nm and 500 nm, or 500 nm and 5 µm; and
   a plurality of acoustically active particles distributed within the polymeric network structure;
   wherein the weight fraction of the acoustically active particles is between 0.80 and 0.99, based on the total weight of the polymer matrix composite;
   further wherein the average percent areal coverage of the porous polymeric network structure on an external surface area of the individual acoustically active particles is less than 50%, based on the total external surface area of the individual acoustically active particles;
   additionally wherein the polymer matrix composite has an air flow resistance of less than 100 seconds/50 mL/500 µm; and
   further wherein the acoustically active particles in the polymer matrix composite enhance the sound pressure level over the frequency range of 200 to 500 Hz as measured using the Sound Pressure Level Test disclosed herein.

2. The polymer matrix composite of claim 1, wherein the polymer matrix composite has a density of between 0.05 to 1 g/cm$^3$.

3. The polymer matrix composite of claim 1, wherein the polymer matrix composite has a porosity of at least 50%.

4. The polymer matrix composite of claim 1, wherein the acoustically active particles comprise acoustically active metal oxide particles.

5. The polymer matrix composite of claim 4, wherein the acoustically active metal oxide particles have an average particle size of 100 nm to 20 µm.

6. The polymer matrix composite of claim 4, wherein the acoustically active metal oxide particles have a specific surface area of at least 50 m$^2$/g.

7. The polymer matrix composite of claim 4, wherein the acoustically active metal oxide particles are hydrophobic.

8. The polymer matrix composite of claim 1, wherein the porous polymeric network structure comprises polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

9. The polymer matrix composite of claim 1, wherein the porous polymeric network structure comprises a polymer having a number average molecular weight of $5\times10^4$ g/mol to $1\times10^7$ g/mol.

10. The polymer matrix composite of claim 1, wherein the polymer matrix composite is in the form of a sheet having a thickness of between 50 micrometers and 5000 micrometers.

11. The polymer matrix composite of claim 1, wherein the porous polymeric network structure is produced by an induced phase separation of a miscible thermoplastic polymer-solvent solution and, optionally, wherein the induced phase separation is at least one of thermally induced phase separation and solvent induced phase separation.

12. A method of making the polymer matrix composite of claim 1, the method comprising:
   mixing a thermoplastic polymer, a solvent that the thermoplastic polymer is soluble in to form a miscible thermoplastic polymer-solvent solution,
   adding the plurality of acoustically active particles to the miscible thermoplastic polymer-solvent solution;
   inducing phase separation of the thermoplastic polymer from the solvent; and
   removing at least a portion of the solvent, thereby forming the polymer matrix composite.

13. The method of claim 12, wherein the inducing phase separation step includes at least one of thermally induced phase separation and solvent induced phase separation.

14. The method of claim 12, wherein the mixing step is conducted at temperature between 20° C. to 350° C.

15. The method of claim 12, wherein the inducing phase separation step is conducted at a temperature that is between 5° C. to 300° C. below the mixing step temperature.

16. The method of claim 12, further comprising stretching or compressing the polymer matrix composite.

17. The method of claim 12, wherein the solvent comprises a paraffin oil or paraffin wax.

18. An electronic device comprising an acoustic device, the acoustic device comprising the polymer matrix composite of claim 1.

* * * * *